(12) United States Patent
Gordon et al.

(10) Patent No.: US 10,093,322 B2
(45) Date of Patent: Oct. 9, 2018

(54) AUTOMATICALLY PROVIDING EXPLANATIONS FOR ACTIONS TAKEN BY A SELF-DRIVING VEHICLE

(71) Applicant: International Business Machines Corporation, Armonk, NY (US)

(72) Inventors: Michael S. Gordon, Yorktown Heights, NY (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,954

(22) Filed: Sep. 15, 2016

(65) Prior Publication Data

US 2018/0072323 A1 Mar. 15, 2018

(51) Int. Cl.
*B60W 50/00* (2006.01)
*H04B 1/3822* (2015.01)
*B60W 50/14* (2012.01)
*B60W 30/09* (2012.01)
*H04W 4/70* (2018.01)

(52) U.S. Cl.
CPC ........ *B60W 50/0097* (2013.01); *B60W 30/09* (2013.01); *B60W 50/14* (2013.01); *H04B 1/3822* (2013.01); *B60W 2050/146* (2013.01); *B60W 2540/22* (2013.01); *B60W 2550/14* (2013.01); *H04W 4/70* (2018.02)

(58) Field of Classification Search
CPC ...... H04W 4/005; H04W 4/70; H04B 1/3822; B60W 50/0097; B60W 30/09; B60W 50/14; B60W 2050/146; B60W 2540/22; B60W 2550/14; B60W 50/08; G05D 1/0088

USPC ............................................... 701/22, 24, 23
See application file for complete search history.

(56) References Cited

U.S. PATENT DOCUMENTS 4,665,395 A 5/1987 Van Ness
4,908,988 A 3/1990 Yamamura et al.
(Continued)

FOREIGN PATENT DOCUMENTS

CN 1135063 11/1996
CN 2349068 Y 11/1999
(Continued)

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Angelina Shudy
(74) *Attorney, Agent, or Firm* — Law Office of Jim Boice

(57) ABSTRACT

A method causes a self-driving vehicle (SDV) to warn passengers of an upcoming maneuver, and to explain why the SDV will be making the upcoming maneuver. One or more processors receive sensor readings that describe a condition of a roadway upon which a self-driving vehicle (SDV) is traveling. The processor(s) predict, based on the sensor readings, a maneuver to be taken at a future time by the SDV on the roadway. The processor(s) also provide an explanation for the maneuver to an occupant of the SDV, where the explanation describes the maneuver, and where the explanation explains why the SDV will be taking the maneuver in the future.

11 Claims, 6 Drawing Sheets

(56) References Cited

U.S. PATENT DOCUMENTS

| | | | |
|---|---|---|---|
| 5,975,791 A | 11/1999 | McCulloch | |
| 6,064,970 A | 5/2000 | McMillian et al. | |
| 6,201,318 B1 | 3/2001 | Guillory | |
| 6,326,903 B1 | 12/2001 | Gross et al. | |
| 6,393,362 B1 | 5/2002 | Burns | |
| 6,502,035 B2 | 12/2002 | Levine | |
| 6,587,043 B1 | 7/2003 | Kramer | |
| 6,622,082 B1 | 9/2003 | Schmidt et al. | |
| 6,731,202 B1 | 5/2004 | Klaus | |
| 6,810,312 B2 | 10/2004 | Jammu et al. | |
| 7,124,088 B2 | 10/2006 | Bauer et al. | |
| 7,580,782 B2 | 8/2009 | Breed et al. | |
| 7,769,544 B2 | 8/2010 | Blesener et al. | |
| 7,877,269 B2 | 1/2011 | Bauer et al. | |
| 7,894,951 B2 | 2/2011 | Norris et al. | |
| 7,979,173 B2 | 7/2011 | Breed | |
| 8,031,062 B2 | 10/2011 | Smith | |
| 8,045,455 B1 | 10/2011 | Agronow et al. | |
| 8,078,349 B1 | 12/2011 | Prada Gomez et al. | |
| 8,090,598 B2 | 1/2012 | Bauer et al. | |
| 8,139,109 B2 | 3/2012 | Schmiedel et al. | |
| 8,140,358 B1 | 3/2012 | Ling et al. | |
| 8,146,703 B2 | 4/2012 | Baumann et al. | |
| 8,152,325 B2 | 4/2012 | McDermott | |
| 8,180,322 B2 | 5/2012 | Lin et al. | |
| 8,346,480 B2 | 1/2013 | Trepagnier et al. | |
| 8,352,112 B2 | 1/2013 | Mudalige | |
| 8,442,854 B2 | 5/2013 | Lawton et al. | |
| 8,466,807 B2 | 6/2013 | Mudalige | |
| 8,489,434 B1 | 7/2013 | Otis et al. | |
| 8,583,365 B2 | 11/2013 | Jang et al. | |
| 8,660,734 B2 | 2/2014 | Zhu et al. | |
| 8,670,891 B1 * | 3/2014 | Szybalski | B62D 1/286 |
| | | | 701/23 |
| 8,676,466 B2 | 3/2014 | Mudalige | |
| 8,678,701 B1 | 3/2014 | Aldasem | |
| 8,786,461 B1 | 7/2014 | Daudelin | |
| 8,810,392 B1 | 8/2014 | Teller et al. | |
| 8,816,857 B2 | 8/2014 | Nordin et al. | |
| 8,874,305 B2 * | 10/2014 | Dolgov | G05D 1/0055 |
| | | | 701/25 |
| 8,880,270 B1 | 11/2014 | Ferguson et al. | |
| 8,903,591 B1 | 12/2014 | Ferguson et al. | |
| 8,924,150 B2 | 12/2014 | Tsimhoni et al. | |
| 8,948,955 B2 | 2/2015 | Zhu et al. | |
| 8,949,016 B1 | 2/2015 | Ferguson et al. | |
| 8,954,217 B1 | 2/2015 | Montemerlo et al. | |
| 8,954,252 B1 | 2/2015 | Urmson et al. | |
| 8,954,261 B2 | 2/2015 | Das et al. | |
| 8,958,943 B2 | 2/2015 | Bertosa et al. | |
| 8,965,621 B1 | 2/2015 | Urmson et al. | |
| 8,970,362 B2 | 3/2015 | Morley et al. | |
| 8,983,705 B2 | 3/2015 | Zhu et al. | |
| 8,996,224 B1 | 3/2015 | Herbach et al. | |
| 9,014,905 B1 | 4/2015 | Kretzschmar et al. | |
| 9,024,787 B2 | 5/2015 | Alshinnawi et al. | |
| 9,123,049 B2 | 9/2015 | Hyde et al. | |
| 9,132,840 B1 * | 9/2015 | Szybalski | B60W 50/14 |
| 9,170,327 B2 | 10/2015 | Choe et al. | |
| 9,189,897 B1 | 11/2015 | Stenneth | |
| 9,194,168 B1 | 11/2015 | Lu et al. | |
| 9,216,745 B2 | 12/2015 | Beardsley et al. | |
| 9,218,698 B2 | 12/2015 | Ricci | |
| 9,286,520 B1 | 3/2016 | Lo et al. | |
| 9,317,033 B2 | 4/2016 | Ibanez-Guzman et al. | |
| 9,390,451 B1 * | 7/2016 | Slusar | G06Q 40/04 |
| 9,399,472 B2 | 7/2016 | Minoiu-Enache | |
| 9,429,947 B1 * | 8/2016 | Wengreen | G05D 1/0016 |
| 9,463,805 B2 | 10/2016 | Kirsch et al. | |
| 9,481,366 B1 * | 11/2016 | Gordon | G05D 1/0088 |
| 9,481,367 B1 * | 11/2016 | Gordon | B60W 30/09 |
| 9,483,948 B1 | 11/2016 | Gordon et al. | |
| 9,495,874 B1 * | 11/2016 | Zhu | G06N 3/00 |
| 9,552,735 B2 | 1/2017 | Pilutti et al. | |
| 9,566,958 B2 | 2/2017 | Waldmann | |
| 9,566,986 B1 | 2/2017 | Gordon et al. | |
| 9,628,975 B1 | 4/2017 | Watkins et al. | |
| 9,646,428 B1 * | 5/2017 | Konrardy | H04W 4/90 |
| 9,646,496 B1 | 5/2017 | Miller | |
| 9,671,314 B2 * | 6/2017 | Followell | G01M 17/04 |
| 9,729,636 B2 * | 8/2017 | Koravadi | H04L 67/12 |
| 9,731,726 B2 * | 8/2017 | Gordon | B60W 40/08 |
| 9,751,532 B2 * | 9/2017 | Gordon | B60W 30/165 |
| 9,767,516 B1 * | 9/2017 | Konrardy | G06Q 40/08 |
| 9,785,145 B2 * | 10/2017 | Gordon | G05D 1/0061 |
| 9,815,481 B2 * | 11/2017 | Goldman-Shenhar | |
| | | | B60W 50/08 |
| 9,834,224 B2 * | 12/2017 | Gordon | B60W 50/082 |
| 9,836,055 B1 * | 12/2017 | Kim | G05D 1/0094 |
| 9,836,973 B2 * | 12/2017 | Gordon | E01F 13/10 |
| 9,858,621 B1 * | 1/2018 | Konrardy | G06Q 40/08 |
| 9,869,560 B2 * | 1/2018 | Gordon | G01C 21/3415 |
| 9,881,427 B2 * | 1/2018 | Barajas Gonzalez | G07C 5/006 |
| 9,881,503 B1 * | 1/2018 | Goldman-Shenhar | |
| | | | G08G 1/166 |
| 9,884,629 B2 * | 2/2018 | Gordon | B60W 40/08 |
| 9,889,716 B2 * | 2/2018 | Banvait | B60G 17/0165 |
| 9,896,100 B2 * | 2/2018 | Gordon | B60W 30/16 |
| 9,905,133 B1 * | 2/2018 | Kumar | G05D 1/0088 |
| 9,915,949 B2 * | 3/2018 | Schwie | G05D 1/0088 |
| 9,934,363 B1 * | 4/2018 | Hwang | G06K 9/00335 |
| 9,940,549 B2 * | 4/2018 | Crawford | G06K 9/6267 |
| 9,944,291 B2 * | 4/2018 | Gordon | B60W 30/182 |
| 9,972,054 B1 * | 5/2018 | Konrardy | G07C 5/08 |
| 2002/0026841 A1 | 3/2002 | Svendsen | |
| 2002/0128774 A1 * | 9/2002 | Takezaki | B60Q 9/00 |
| | | | 701/431 |
| 2003/0065572 A1 | 4/2003 | McNee et al. | |
| 2003/0076981 A1 | 4/2003 | Smith et al. | |
| 2003/0181822 A1 * | 9/2003 | Victor | A61B 3/113 |
| | | | 600/558 |
| 2004/0078133 A1 | 4/2004 | Miller | |
| 2004/0199306 A1 | 10/2004 | Helmann et al. | |
| 2005/0021227 A1 * | 1/2005 | Matsumoto | G01C 21/3415 |
| | | | 701/431 |
| 2005/0104745 A1 | 5/2005 | Bachelder et al. | |
| 2006/0106671 A1 | 5/2006 | Biet | |
| 2006/0163939 A1 | 7/2006 | Kuramochi et al. | |
| 2006/0200379 A1 | 9/2006 | Biet | |
| 2006/0241855 A1 | 10/2006 | Joe et al. | |
| 2007/0100687 A1 | 5/2007 | Yoshikawa | |
| 2007/0124027 A1 | 5/2007 | Betzitza et al. | |
| 2008/0048850 A1 | 2/2008 | Yamada | |
| 2008/0065293 A1 * | 3/2008 | Placke | B60K 31/0008 |
| | | | 701/41 |
| 2008/0114663 A1 | 5/2008 | Watkins et al. | |
| 2008/0129475 A1 | 6/2008 | Breed et al. | |
| 2008/0201217 A1 | 8/2008 | Bader et al. | |
| 2008/0288406 A1 | 11/2008 | Seguin et al. | |
| 2009/0094109 A1 | 4/2009 | Aaronson et al. | |
| 2009/0138168 A1 * | 5/2009 | Labuhn | B60W 10/10 |
| | | | 701/93 |
| 2009/0248231 A1 | 10/2009 | Kamiya | |
| 2009/0313096 A1 | 12/2009 | Kama | |
| 2010/0045452 A1 * | 2/2010 | Periwal | B60Q 9/00 |
| | | | 340/439 |
| 2010/0057511 A1 | 3/2010 | Mansouri et al. | |
| 2010/0070932 A1 * | 3/2010 | Hur | G09B 5/06 |
| | | | 715/863 |
| 2010/0156672 A1 | 6/2010 | Yoo et al. | |
| 2010/0179720 A1 | 7/2010 | Lin et al. | |
| 2010/0228427 A1 | 9/2010 | Anderson et al. | |
| 2010/0256852 A1 | 10/2010 | Mudalige | |
| 2011/0029173 A1 | 2/2011 | Hyde et al. | |
| 2011/0035250 A1 | 2/2011 | Finucan | |
| 2011/0077807 A1 | 3/2011 | Hyde et al. | |
| 2011/0077808 A1 | 3/2011 | Hyde et al. | |
| 2011/0137699 A1 | 6/2011 | Ben-Ari et al. | |
| 2011/0190972 A1 * | 8/2011 | Timmons | G01C 21/34 |
| | | | 701/31.4 |
| 2011/0213511 A1 * | 9/2011 | Visconti | B60W 40/09 |
| | | | 701/1 |
| 2011/0264521 A1 | 10/2011 | Straka | |

(56) References Cited

U.S. PATENT DOCUMENTS

| | | |
|---|---|---|
| 2012/0072243 A1 | 3/2012 | Collins et al. |
| 2012/0083959 A1* | 4/2012 | Dolgov ............... G05D 1/0214 701/23 |
| 2012/0139756 A1 | 6/2012 | Djurkovic |
| 2012/0277947 A1 | 11/2012 | Boehringer et al. |
| 2012/0310480 A1* | 12/2012 | Schmidt ............... B60W 50/14 701/41 |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0156133 A1* | 6/2014 | Cullinane ............ B60W 30/00 701/23 |
| 2014/0156135 A1* | 6/2014 | Maki .................... G07C 5/008 701/29.1 |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1* | 7/2014 | Eckert ................... B60Q 1/488 701/28 |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |
| 2014/0324268 A1 | 10/2014 | Montemerlo et al. |
| 2014/0330479 A1 | 11/2014 | Dolgov |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0006014 A1 | 1/2015 | Wimmer et al. |
| 2015/0026092 A1 | 1/2015 | Abboud et al. |
| 2015/0035685 A1 | 2/2015 | Strickland et al. |
| 2015/0051778 A1 | 2/2015 | Mueller |
| 2015/0057891 A1 | 2/2015 | Mudalige et al. |
| 2015/0062340 A1 | 3/2015 | Datta et al. |
| 2015/0062469 A1 | 3/2015 | Fleury |
| 2015/0066282 A1* | 3/2015 | Yopp .................... G05D 1/0061 701/24 |
| 2015/0066284 A1 | 3/2015 | Yopp |
| 2015/0070178 A1 | 3/2015 | Kline |
| 2015/0088358 A1 | 3/2015 | Yopp |
| 2015/0095190 A1 | 4/2015 | Hammad et al. |
| 2015/0120331 A1 | 4/2015 | Russo et al. |
| 2015/0134178 A1 | 5/2015 | Minoiu-Enache |
| 2015/0137985 A1 | 5/2015 | Zafiroglu et al. |
| 2015/0141043 A1 | 5/2015 | Abramson |
| 2015/0142244 A1* | 5/2015 | You ....................... G01C 21/00 701/23 |
| 2015/0149018 A1* | 5/2015 | Attard ................... G05D 1/0061 701/23 |
| 2015/0149021 A1 | 5/2015 | Duncan et al. |
| 2015/0149088 A1* | 5/2015 | Attard ................... G01C 21/36 701/538 |
| 2015/0160019 A1* | 6/2015 | Biswal .................. G01C 21/26 701/1 |
| 2015/0166059 A1 | 6/2015 | Ko |
| 2015/0175070 A1 | 6/2015 | Attard et al. |
| 2015/0178998 A1 | 6/2015 | Attard et al. |
| 2015/0196256 A1 | 7/2015 | Venkatraman et al. |
| 2015/0232065 A1 | 8/2015 | Ricci et al. |
| 2015/0242953 A1 | 8/2015 | Suiter |
| 2015/0253775 A1* | 9/2015 | Jacobus ................ G05D 1/024 701/23 |
| 2015/0293994 A1 | 10/2015 | Kelly |
| 2015/0336502 A1* | 11/2015 | Hillis ..................... B60Q 1/26 701/23 |
| 2015/0338226 A1 | 11/2015 | Mason et al. |
| 2015/0339639 A1 | 11/2015 | Choe |
| 2016/0001781 A1 | 1/2016 | Fung et al. |
| 2016/0026182 A1 | 1/2016 | Boroditsky et al. |
| 2016/0075512 A1 | 3/2016 | Lert, Jr. |
| 2016/0078695 A1 | 3/2016 | McClintic et al. |
| 2016/0078758 A1 | 3/2016 | Basalamah |
| 2016/0090100 A1 | 3/2016 | Oyama et al. |
| 2016/0104486 A1* | 4/2016 | Penilla ................. H04L 67/12 704/232 |
| 2016/0139594 A1 | 5/2016 | Okumura et al. |
| 2016/0140507 A1 | 5/2016 | Stevens et al. |
| 2016/0176409 A1 | 6/2016 | Kirsch et al. |
| 2016/0202700 A1 | 7/2016 | Sprigg |
| 2016/0205146 A1 | 7/2016 | Sugioka et al. |
| 2016/0221500 A1* | 8/2016 | Sakai .................... B60Q 9/008 |
| 2016/0303969 A1 | 10/2016 | Akula |
| 2016/0334797 A1 | 11/2016 | Ross et al. |
| 2016/0344737 A1 | 11/2016 | Anton |
| 2016/0355192 A1 | 12/2016 | James et al. |
| 2016/0364823 A1 | 12/2016 | Cao |
| 2017/0001650 A1 | 1/2017 | Park |
| 2017/0010613 A1 | 1/2017 | Fukumoto |
| 2017/0021830 A1 | 1/2017 | Feldman et al. |
| 2017/0021837 A1 | 1/2017 | Ebina |
| 2017/0057516 A1* | 3/2017 | Gordon ................ B60W 40/08 |
| 2017/0057542 A1 | 3/2017 | Kim et al. |
| 2017/0060130 A1* | 3/2017 | Kim ..................... G05D 1/0055 |
| 2017/0068245 A1* | 3/2017 | Scofield .............. G08G 1/0112 |
| 2017/0072850 A1* | 3/2017 | Curtis .................. B60W 50/0097 |
| 2017/0076000 A1* | 3/2017 | Ashoori ............. G06F 17/30867 |
| 2017/0088143 A1* | 3/2017 | Goldman-Shenhar ................... B60K 35/00 |
| 2017/0088145 A1* | 3/2017 | Gordon ................ B60W 50/12 |
| 2017/0106876 A1 | 4/2017 | Gordon et al. |
| 2017/0113689 A1* | 4/2017 | Gordon ................ B60W 30/182 |
| 2017/0123428 A1 | 5/2017 | Levinson et al. |
| 2017/0124658 A1* | 5/2017 | Gordon ................ G06Q 40/08 |
| 2017/0129487 A1 | 5/2017 | Wulf |
| 2017/0132708 A1* | 5/2017 | Gordon ................ G06Q 40/08 |
| 2017/0140757 A1* | 5/2017 | Penilla ................. G10L 15/22 |
| 2017/0151958 A1* | 6/2017 | Sakuma ............... B60W 50/10 |
| 2017/0168689 A1* | 6/2017 | Goldman-Shenhar .... G06F 8/38 |
| 2017/0176192 A1* | 6/2017 | Cardoso de Moura ................... G01C 21/34 |
| 2017/0185078 A1* | 6/2017 | Weast .................. H04W 4/008 |
| 2017/0200449 A1* | 7/2017 | Penilla ................. G10L 15/22 |
| 2017/0217276 A1* | 8/2017 | Banvait .............. B60G 17/0162 |
| 2017/0217445 A1* | 8/2017 | Tzirkel-Hancock ................... B60W 50/08 |
| 2017/0221480 A1* | 8/2017 | Tzirkel-Hancock .... G10L 15/22 |
| 2017/0232891 A1* | 8/2017 | Nordbruch ............ B60Q 9/002 701/23 |
| 2017/0235308 A1* | 8/2017 | Gordon ................ G05D 1/0088 701/2 |
| 2017/0253250 A1* | 9/2017 | Gordon ................ B60W 40/08 |
| 2017/0263120 A1* | 9/2017 | Durie, Jr. ........... G06F 17/30823 |
| 2017/0357862 A1* | 12/2017 | Tatsubori ........... G06K 9/00805 |
| 2017/0366614 A1* | 12/2017 | Koravadi ......... G08G 1/096708 |
| 2018/0005527 A1* | 1/2018 | Bostick ................ G08G 1/0969 |
| 2018/0012497 A1* | 1/2018 | Penilla ................. G05D 1/0022 |
| 2018/0057016 A1* | 3/2018 | Gordon ................ B60W 50/082 |
| 2018/0059913 A1* | 3/2018 | Penilla ................. G07C 5/008 |
| 2018/0061237 A1* | 3/2018 | Erickson .............. G08G 1/163 |
| 2018/0061415 A1* | 3/2018 | Penilla ................. G10L 15/22 |
| 2018/0065631 A1* | 3/2018 | Gordon ................ A61B 5/18 |
| 2018/0065632 A1* | 3/2018 | Gordon ................ A61B 5/18 |
| 2018/0068558 A1* | 3/2018 | Gordon ................ E01F 13/10 |

(56) References Cited

U.S. PATENT DOCUMENTS

| | | | |
|---|---|---|---|
| 2018/0075538 A1* | 3/2018 | Konrardy | G06Q 40/08 |
| 2018/0075759 A1* | 3/2018 | Kim | G08G 5/0069 |
| 2018/0080779 A1* | 3/2018 | Gordon | G05D 1/0212 |
| 2018/0088572 A1* | 3/2018 | Uchida | G05D 1/0061 |
| 2018/0099669 A1* | 4/2018 | Gordon | B60W 40/04 |
| 2018/0129204 A1* | 5/2018 | Ricci | G05D 1/0088 |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| WO | 2014058263 | 4/2014 |
| WO | 2014066721 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |
| WO | 2015156146 A1 | 10/2015 |

OTHER PUBLICATIONS

Schick, S. "When Drivers Become Passengers: The Psychological Impact of Autonomous Cars", 360.HERE.COM, Feb. 9, 2015, Web. Mar. 25, 2016. <http://360.here.com/2015/02/09/drivers-become-passengers-psychological-impact-autonomous-cars/>.

Anonymous, 'System and Method to Target Advertisements for the Right Focus Group'. IP.Com, No. 000218285, May 31, 2012, pp. 1-2.

Anonymous, "Car Built-In Mechanism to Enforce Mandatory Self-Driving Mode", IP.Com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", The Energy Collective, Theenergycollective.com, Aug. 19, 2014, pp. 1-7.

Chen S, et al., "A Crash Risk Assessment Model for Roas Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilities", IP.Com, Jun. 6, 2014, pp. 1-5. IP.Com.

Brownell, "Shared Autonomous Taxi Networks: An Analysis of Transportation Demand in NJ and a 21st Century Solution for Congestion", Dissertation, Princeton University, 2013, pp. 1-122.

Sessa et al., "Blueprint of Alternative City Cyber-Mobility Take-U Scenarios", Seventh Framework Programme Theme SST.2012.3.1-4, Automated Urban Vehicles Collaborative Project—Grant Agreement No: 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze IM Ubruch, Springer Berlin Heidelberg, 2015, pp. 539-549.

Jimenez et al.; "Autonomous collision avoidance system based on accurate knowledge of the vehicle surroundings"; Inst Engineering Technology-IET; IET Intelligent Transport Systems vol. 9, No. 1, pp. 105-117; 2015; England.

Anonymous, "Avoiding Crashes With Self-Driving Cars: Today's Crash-Avoidance Systems Are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". Patentlymobile.com, Nov. 27, 2015. Web. Sep. 22, 2016. <http://www.patentlymobile.com/2015/11/Google-Files-Patent-For-Second-Gen-Autonomous-Vehicle-Without-a-Steering-Wheel-Brake-Pedal-More.html>.

C. Berger et al., "COTS-Architecture with a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

* cited by examiner

AUTOMATICALLY PROVIDING EXPLANATIONS FOR ACTIONS TAKEN BY A SELF-DRIVING VEHICLE

BACKGROUND

The present disclosure relates to the field of vehicles, and specifically to the field of self-driving vehicles. Still more specifically, the present disclosure relates to the field of providing explanations to riders of a self-driving vehicle that describe actions taken by the self-driving vehicle.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In an embodiment of the present invention, a method and/or computer program product cause a self-driving vehicle (SDV) to warn passengers of an upcoming maneuver, and to explain why the SDV will be making the upcoming maneuver. One or more processors receive sensor readings that describe a condition of a roadway upon which a self-driving vehicle (SDV) is traveling. The processor(s) predict, based on the sensor readings, a maneuver to be taken at a future time by the SDV on the roadway. The processor(s) also provide an explanation for the maneuver to an occupant of the SDV, where the explanation describes the maneuver, and where the explanation explains why the SDV will be taking the maneuver in the future.

In an embodiment of the present invention, a system includes an on-board computer with one or more processors, one or more computer readable memories, one or more computer readable storage mediums, and program instructions stored on at least one of the one or more storage mediums for execution by at least one of the one or more processors via at least one of the one or more memories. The stored program instructions include: program instructions to receive sensor readings that describe a condition of a roadway upon which a self-driving vehicle (SDV) is traveling; program instructions to predict, based on the sensor readings, a maneuver to be taken at a future time by the SDV on the roadway; and program instructions to provide an explanation for the maneuver to an occupant of the SDV, where the explanation describes the maneuver, and where the explanation explains why the SDV will be taking the maneuver in the future.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
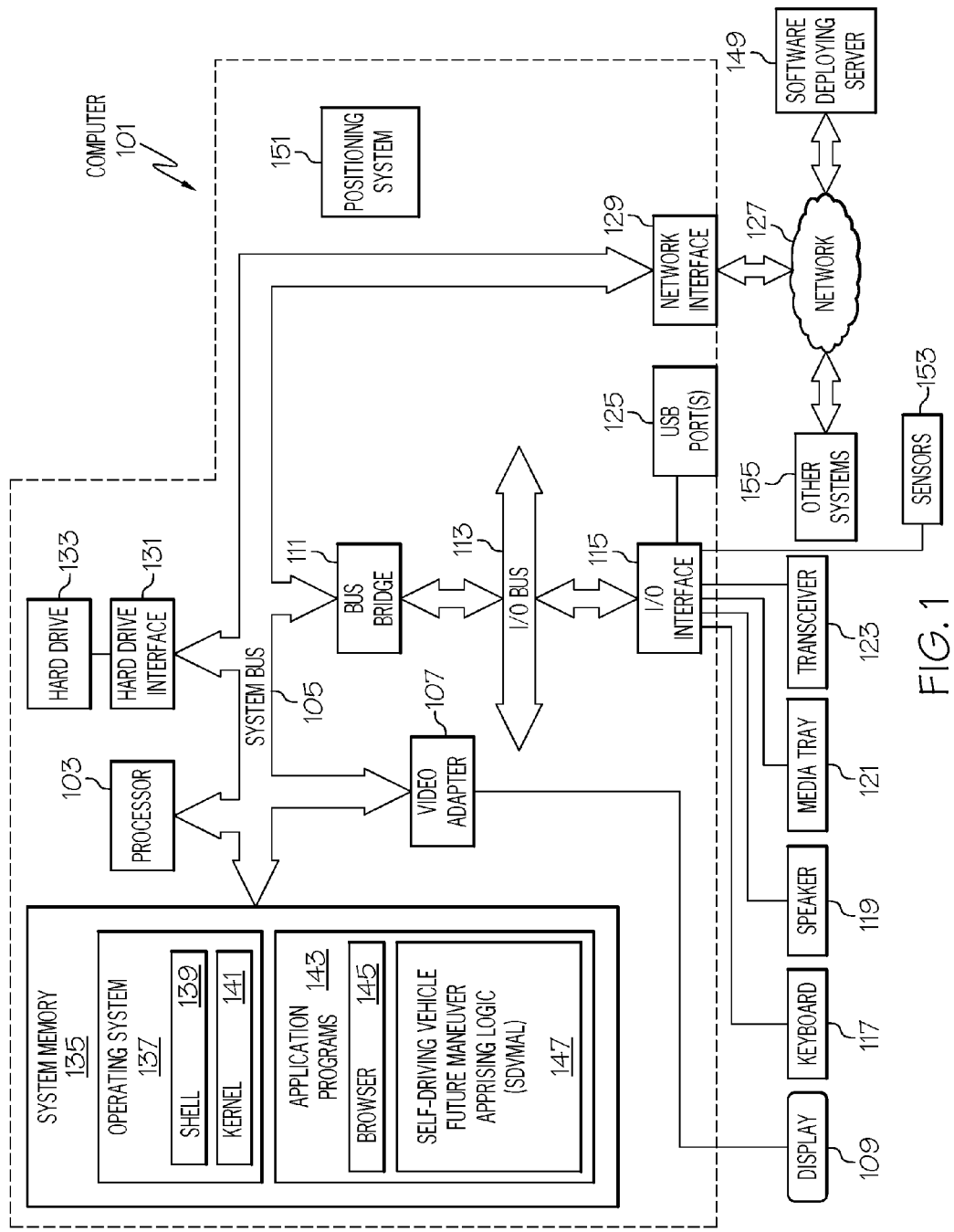
FIG. 1 depicts an exemplary system in accordance with one or more embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or monitoring system 201 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
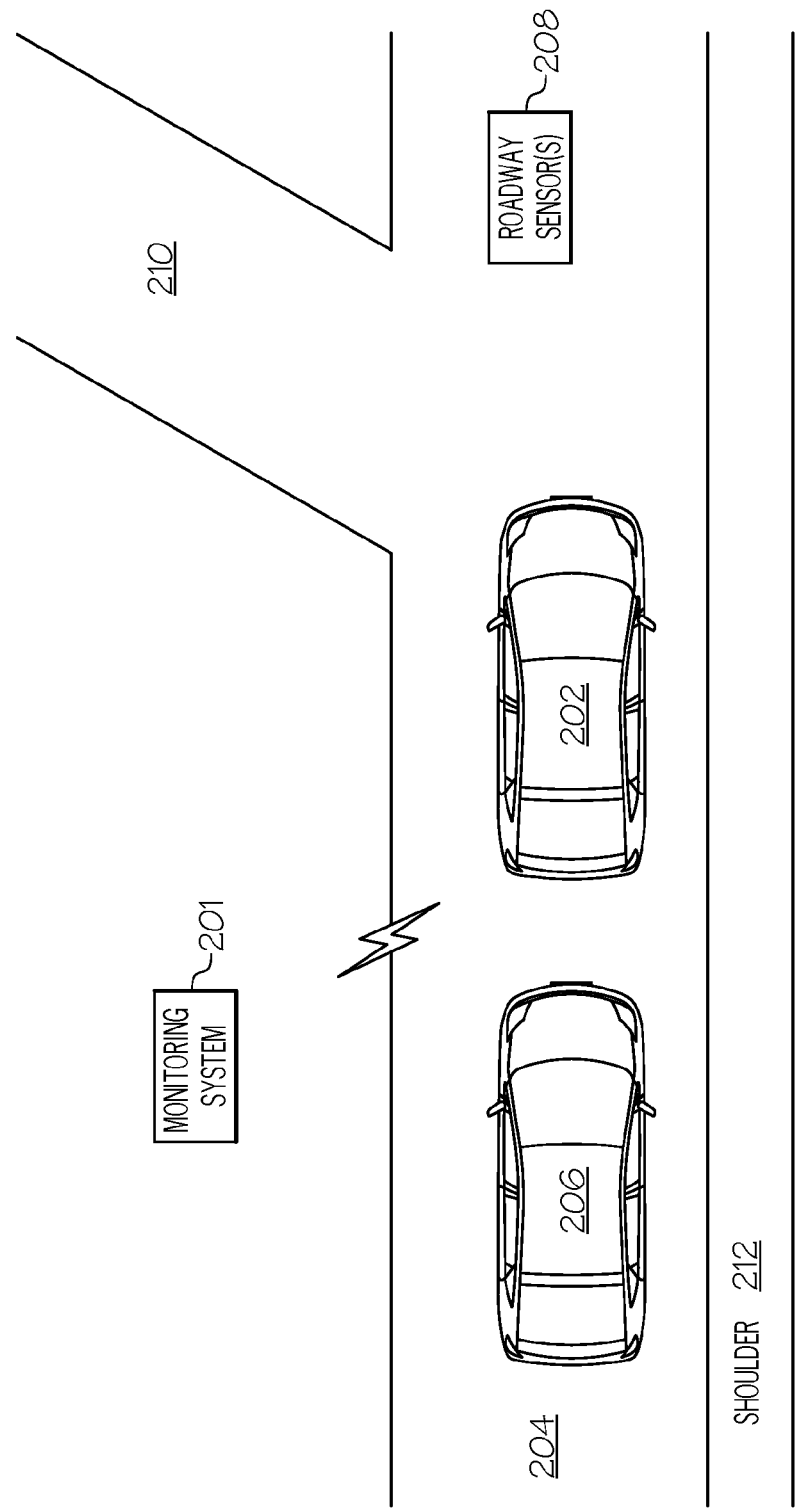
FIG. 2 illustrates an exemplary self-driving vehicle (SDV) performing a maneuver on a roadway in accordance with one or more embodiments of the present invention.

As depicted, computer 101 is able to communicate with a software deploying server 149 and/or other systems 155 (e.g., establishing communication between monitoring system 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Future Maneuver Apprising Logic (SDVFMAL) 147. SDVFMAL 147 includes code for implementing the processes described below, including those described in FIGS. 2-5. In one embodiment, computer 101 is able to download SDVFMAL 147 from software deploying server 149, including in an on-demand basis, wherein the code in SDVFMAL 147 is not downloaded until needed for execution. In one embodiment of the present invention, software deploying server 149 performs all of the functions associated with the present invention (including execution of SDVFMAL 147), thus freeing computer 101 from having to use its own internal computing resources to execute SDVFMAL 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of occupants of a self-driving vehicle (SDV). More specifically, when detecting the environment of the SDV, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors such as chemical sensor 327 shown in FIG. 3 for detecting chemical spills on a roadway, moisture detectors, etc. that detect ambient weather conditions, traffic conditions (as detected by the cameras, microphones, etc.), and other environmental conditions of a roadway upon which the SDV is traveling. When detecting the state of occupants of the SDV, sensors 153 may any type of device capable of detecting the biometric state of the occupants of the SDV, including but not limited to cameras (that detect facial and body movements), microphones such as microphone 331 shown in FIG. 3 that detect vocalizations, body sounds, etc. emanating from the occupants, biometric sensors (e.g., electrocardiograph (ECG/EKG) monitors, blood pressure monitors, etc.), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As used herein, the terms "passenger" and "occupant" are used interchangeably to mean a human person who is riding in a vehicle, including a self-driving vehicle (SDV). As such, the passenger/occupant may or may not be a current or future driver of the SDV when the SDV is in manual mode.

With reference now to FIG. 2, an exemplary self-driving vehicle (SDV) 202 is depicted traveling along a roadway 204. Assume now that SDV 202 determines (e.g., using the SDV on-board computer 301 described below in FIG. 3) that a future maneuver will be required. For example, assume that SDV 202 determines that it is being followed too closely by vehicle 206 (which may be another SDV or may be a human operated vehicle). As such, SDV 202 will automatically increase its speed, in order to place more distance between SDV 202 and vehicle 206. However, the occupants of SDV 202 will not know why SDV 202 is speeding up, and may assume/fear that there is a malfunction in SDV 202 (as evidenced by its increase in speed for no apparent reason). The present invention addresses this problem by explaining the maneuver to the occupant(s) of SDV 202 before the SDV 202 performs the maneuver.

Similarly, SDV 202 may receive signals from roadway sensor(s) 208 of a problem on roadway 204. For example, roadway sensor(s) 208 may detect heavy traffic, ice on the road, windy conditions, a loose object on the roadway, etc. As such, SDV 202 may take an alternate route (e.g., roadway 210) or even pull onto the shoulder 212 of the roadway 204 in order to avoid the problem sensed by the roadway sensor(s) 208. Again, the occupants of SDV 202 will not know why the SDV 202 is making such a move/maneuver, particularly pulling onto the shoulder 212, and may assume that there is a serious defect with the computer that is controlling the SDV 202. Again, the present invention addresses this problem by warning the occupants of SDV 202 before the SDV 202 performs the maneuver.

Figure 3:
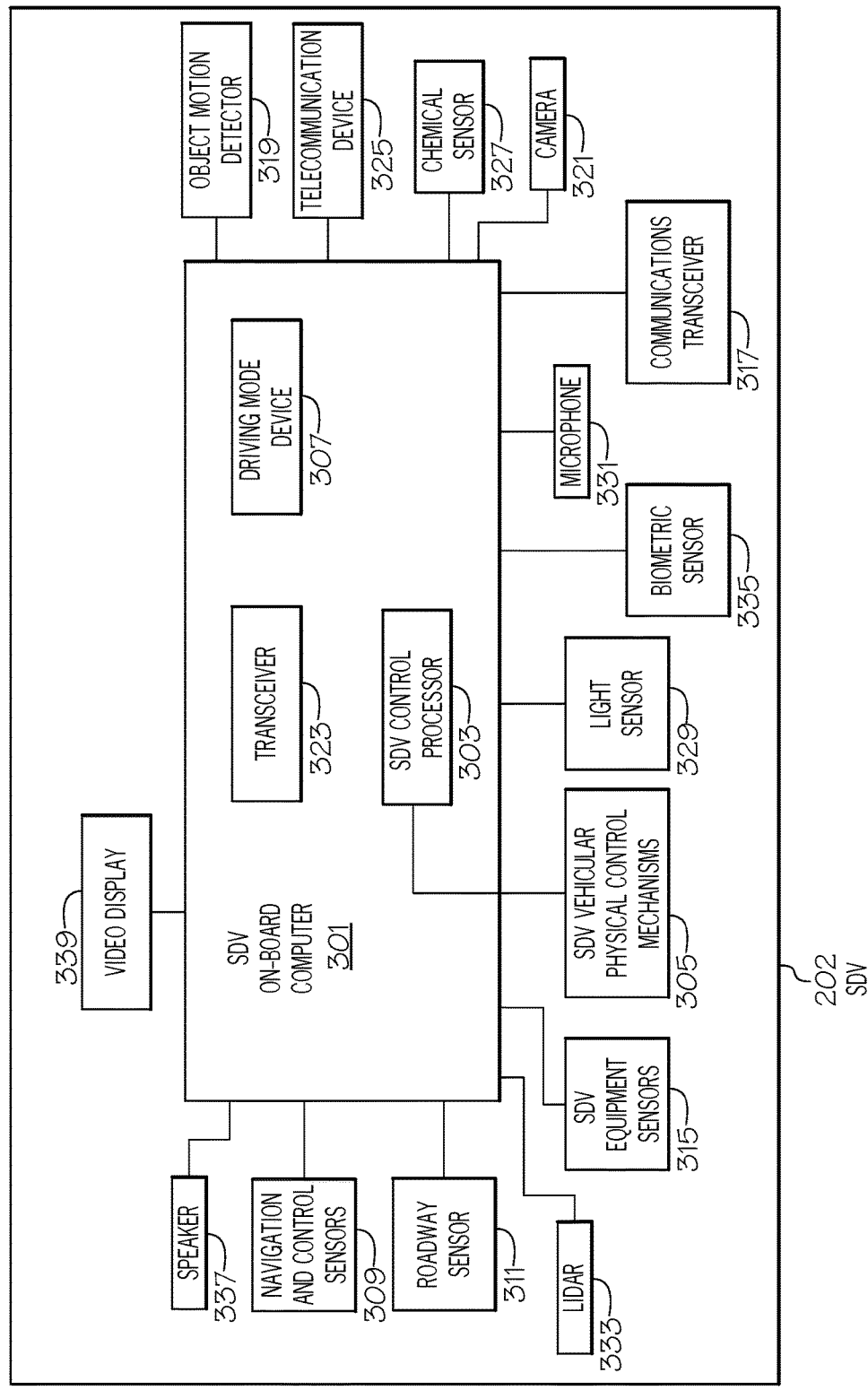
FIG. 3 depicts additional detail of the SDV illustrated in FIG. 2.

With reference now to FIG. 3, additional details of one or more embodiments of the SDV 202 are presented.

As shown in FIG. 3, SDV 202 has an SDV on-board computer 301 that controls operations of the SDV 202. According to directives from a driving mode device 307, the SDV 202 can be selectively operated in manual mode or autonomous mode. In a preferred embodiment, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluating a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 204 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Roadway sensors 311 may also include sensors that are also able to detect how dark the roadway 204 is using light sensors.

Similarly, a dedicated camera 321 can be trained on roadway 204, in order to provide photographic images of conditions on the roadway 204 upon which the SDV 202 is traveling.

Similarly, a dedicated object motion detector 319 (e.g., a radar transceiver capable of detecting Doppler shifts indicative of the speed and direction of movement of other vehicles, animals, persons, etc. on the roadway 204) can be trained on the roadway 204 upon which the SDV 202 is traveling.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, in one or more embodiments of the present invention, if the SDV performs an anomalous maneuver (e.g., pulls off to the shoulder 212 of roadway 204), the SDV will warns the occupants before pulling off to the shoulder 212, such that this anomalous maneuver will not surprise the occupants of the SDV (particularly due to equipment malfunctions on the SDV and/or roadway conditions).

In one or more embodiments of the present invention, also within SDV 202 is a communications transceiver 317, which is able to receive and transmit electronic communication signals (e.g., RF messages) from and to other communications transceivers found in other vehicles, servers, monitoring systems, etc.

In one or more embodiments of the present invention, also within SDV 202 is a telecommunication device 325 (e.g., a smart phone, a cell phone, a laptop computer, etc.), which may be connected (e.g., via a near field communication—NFC connection) to the SDV on-board computer 301.

In one or more embodiments of the present invention, also within SDV 202 is a speaker 337, which is able to broadcast aural warnings (e.g., a buzzer, alarm, or computer-generated voice) that apprise the occupants of the SDV 202 of an upcoming maneuver that the occupants would not be expecting.

In one or more embodiments of the present invention, also within SDV 202 is a video display 339, which is able to display visual warnings (e.g., a flashing light, a text message, etc.) that apprise the occupants of the SDV 202 of an upcoming maneuver that the occupants would not be expecting.

Thus, disclosed herein is a method and system that incorporates a self-driving vehicle (SDV), an on-board computer that enables the SDV to determine what actions/maneuvers the SDV is about to take, and an interface (e.g., a speaker, a display, etc.) that describes the actions/maneuvers that the SDV is about to take to passengers in a car. This system is useful not only in reducing any emotional discomfort that the occupants in the car may experience from such unexpected actions/maneuvers of the SDV, but also provide a useful driver training tool to student drivers, by providing an explanation (from the on-board "expert" system) of the reasoning behind making such actions/maneuvers.

For example, assume that the SDV 202 shown in FIG. 2 is slowing down on the roadway 204. Before doing so, however, the SDV on-board computer 301 shown in FIG. 3 will broadcast a message through the speaker 337 (or on the video display 339) stating "I am now slowing down before making this turn" (e.g., onto roadway 210). Similarly, the SDV on-board computer 301 may broadcast a similar message such as "I am slowing down in order to take a detour route", "I am slowing down due to detected road conditions", etc. This allows the passenger/occupant of the SDV 202 to feel more comfortable by knowing why a specific action was taken (thus reducing user anxiety level), and/or provides a driving lesson to the occupant with regard to how to be a better driver when manually driving the SDV 202.

In one or more embodiments of the present invention, the content of the message, the form of the message, and even whether or not to broadcast the message to the passenger of the SDV may vary. That is, certain passengers (e.g., new drivers, anxious passengers, etc.) may need very detailed messages related to upcoming maneuvers by the SDV, while other passengers (e.g., experienced drivers, passengers who are very familiar with the operations of the SDV, etc.) may need messages with few details, if they need the messages at all. In one or more embodiments of the present invention, determining the level of detail for the warning messages (and if they are presented at all) is based on what cohort the current passengers in the SDV belong to. That is, the passenger cohort may be any of that for a student learner (who may need a lot of technical information in messages explaining the reasoning for taking certain maneuvers such as "I am using the turn signal now, 50 feet in advance"); a nervous passenger (who may need less technical information and more reassuring messages such as "Do not worry; I am taking a detour because the street ahead has congestion" or "This upcoming slow down is normal"); a passenger in an unfamiliar territory ("I'll be speeding up on this curve, since I know that there are no intersections around the curve"), a passenger who is not familiar with roadway conditions ("I'm slowing down since there was a report of ice up ahead"); etc.

Cohorts to which the passengers of the SDV are assigned may also relate to driving experience. For example, a passenger who has a minimum of 50 hours of supervised practice driving with at least 15 hours at night (after sunset) and at least 10 hours in moderate to heavy traffic might receive different explanations than drivers with less training/experience.

Explanations from the SDV to the passenger of the SDV may also relate to guidance related to proper steering (including steering while backing up), acceleration, braking and stopping the vehicle in the proper position of the lane, being sure the vehicle is in the correct gear, appropriate speed for weather, road, visibility and traffic conditions, backing up a boat trailer at a launching ramp, etc.

Explanations may also relate to following distances (e.g., increasing the following distance behind other vehicles in poor weather or visibility); proper use of headlights; understanding of traffic signs, signals and pavement markings, etc.

Explanations may also relate to stopping positions. For example, when the SDV is about to stop at an intersection, it may say (via the SDV on-board computer 301 and the on-board speaker 337 in the SDV 202 shown in FIG. 2) to the student driver, "You should stop your vehicle before it reaches an intersecting street. If stop lines or crosswalks are present, stop before crossing them. If your view is blocked after stopping behind the crosswalk, move up until you can clearly see your way, then stop again if necessary."

Explanations may also relate to lane selection and position. For example, before making a turn, lane change, etc., the SDV may say (via the SDV on-board computer 301 and the on-board speaker 337 in the SDV 202 shown in FIG. 2) to the student driver, "Keep your vehicle in the proper traffic lane, especially when preparing to make turns." or "Don't allow room for another vehicle to pass you on the side that you are turning toward."

Explanations may relate to complex navigations, letting other drivers and pedestrians know your intent before making a maneuver (such as a lane change) with directional signals or the vehicle horn, etc.

Explanations may also relate to general driving tips, such as "Look for and identify potential problems or hazards in the traffic around you—not just straight ahead, but behind you and on either side", or "Check your mirrors frequently, but be sure to look over your shoulder behind you when changing lanes or backing up", etc.

Explanations may also relate to anticipation and reactions such as "I am now thinking about possible driving errors by others and am ready to react safely to make up for their mistakes".

Explanations may also relate to watching for and abiding by autonomous vehicle railroad crossings and warning systems.

Explanations may also depend on a cognitive condition (e.g., impairment or distraction level) of a passenger, which may be detected. If desired, this may be reported verbally, which might deter the passenger from desiring to drive in manual mode.

Explanations may also be given during approaches to parking and while parking.

All such guidance may aid in training the driver.

Certain information, instead of being spoken, may be displayed, such as on a graphic projection display, a head-up display, or on an infotainment display.

Explanations may also relate to faults within the SDV. That is, rather than provide explanations for anomalous actions taken by the SDV as a result of roadway/traffic conditions, one or more embodiments of the present invention will warn the passenger of the SDV that an anomalous action (e.g., slowing down, pulling over, etc.) will be in response to a fault (e.g., a flat tire, an overheating engine, etc.) with the SDV itself.

In one or more embodiments, the SDV may inject humor or compassion for nervous passengers, if appropriate.

While the figures in the present description depict land-based vehicles (e.g., cars), the present invention is also applicable to use in autonomous boats, aircraft, trucks, etc. That is, the principles described herein for use with cars are also applicable to use in other types of vehicles. For example, if an autonomous boat were to suddenly slow down in the middle of a lake, the autonomous boat would warn passengers that it is going to do so (e.g., due to floating debris ahead of the boat).

As described herein, the present invention warns passengers of the SDV when an upcoming anomalous maneuver is about to be performed. In order to "know" that such an anomalous maneuver is about to be performed, the SDV on-board computer 301 shown in FIG. 3 (and/or the monitoring system 201 shown in FIG. 2) will make a prediction that the anomalous maneuver is about to be performed.

Figure 4:
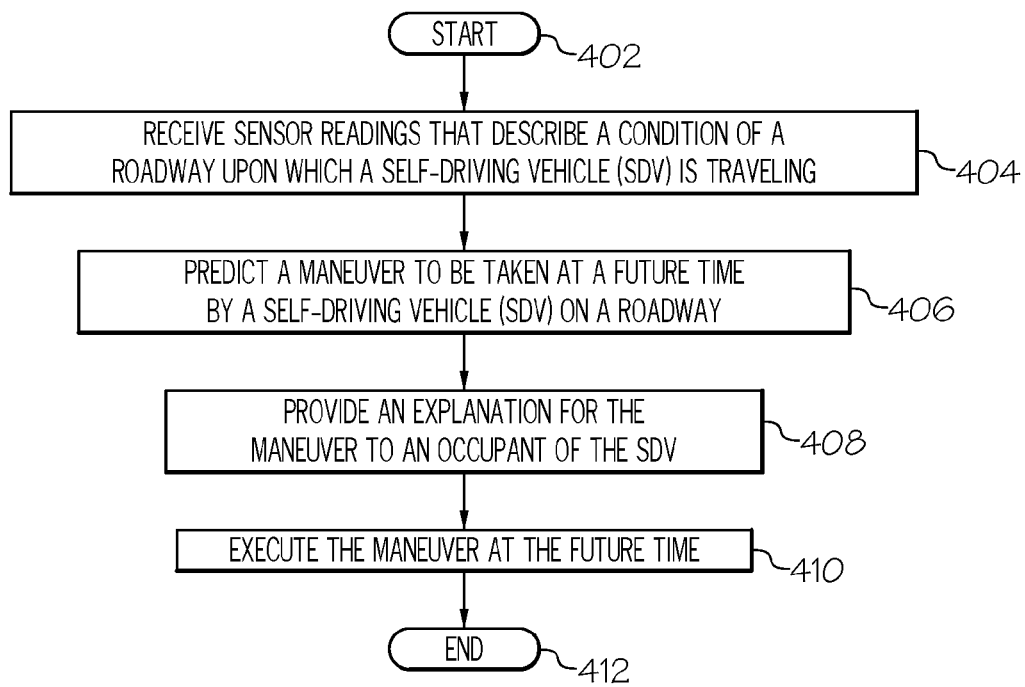
FIG. 4 is a high-level flow chart illustrating a process in accordance with one or more embodiments of the present invention.

With reference now to FIG. 4, a high-level flow chart of one or more steps performed by an SDV to apprise one or more occupants of a SDV of a future maneuver to be performed by the SDV and/or a purpose of the future maneuver in accordance with one or more embodiments of the present invention is presented.

After initiator block 402, one or more processors (e.g., within SDV on-board computer 301 shown in FIG. 3 and/or within monitoring system 201 shown in FIG. 2) receive sensor readings (e.g., from roadway sensor(s) 208 shown in FIG. 2) that describe a condition of a roadway (e.g., roadway 204 shown in FIG. 2) upon which a self-driving vehicle (SDV) (e.g., SDV 202 shown in FIG. 2), as described in block 404.

As described in block 406 in FIG. 4, the processor(s) predict, based on the sensor readings, a maneuver to be taken at a future time by the SDV on the roadway.

As described in block 408, the processor(s) then provide an explanation for the maneuver to an occupant of the SDV. The explanation not only describes the maneuver (e.g., "The SDV will be slowing down . . . "), but also explains why the SDV will be taking the maneuver in the future (" . . . since there is ice on the roadway").

In one or more embodiments of the present invention, the aural/visual warnings are provided a certain number of times, depending on the occupant(s). For example, is the occupants are known to be from a cohort that responds well to repeated assurances ("Everything is fine; we're just slowing down" followed by "Everything is fine; we're just slowing down" followed by "We're just about to stop now" etc.), then such repetitions will occur. However, if the occupants are known to be from a cohort that only needs to hear information once ("Everything is fine; we're just slowing down"), then the information will be presented only one time.

As described in block 410, once the SDV has warned the occupants of the SDV about the maneuver that will be performed, the SDV then executes that maneuver (at the future time).

The flow-chart ends at terminator block 412.

In an embodiment of the present invention, the explanation is conveyed aurally (e.g., a warning sound, a computer-generated speech, etc. sent through the speaker 337 within the SDV 202 as shown in FIG. 3) to the occupant of the SDV.

In an embodiment of the present invention, the explanation is conveyed visually (e.g., a flashing light, a displayed text message, etc. on the video display 339 within the SDV 202 as shown in FIG. 3) to the occupant of the SDV.

As described herein, in one or more embodiments of the present invention the occupant of the SDV is a student driver, and the explanation provides a driving lesson to the student driver. For example, the SDV may send a message over the on-board speaker stating a tutorial message such as "Just as this autonomous SDV will be doing, you too should slow down on icy roads when driving a vehicle".

In an embodiment of the present invention, if the SDV on-board computer 301 detects hazardous roadway conditions (e.g., from roadway sensor(s) 208 shown in FIG. 2, and/or from roadway sensors 311 and/or from SDV equipment sensors 315 shown in FIG. 3), then the SDV on-board computer 301 will 1) re-route the SDV 202 (e.g., from roadway 204 to roadway 210 shown in FIG. 2); 2) warn the occupant(s) of the SDV 202 that the SDV 202 is about to be re-routed ("We're going to take Roadway 210 in half a mile . . . "); and 3) explain why the rerouting is going to occur (" . . . since there is an obstruction on roadway 204 one mile ahead"). Thus, one or more processors (e.g., within SDV on-board computer 301) will detect, based on roadway sensors readings from roadway sensors, roadway conditions of the roadway; will reroute the SDV due to the roadway conditions of the roadway; and will then provide the explanation to describe the roadway conditions of the roadway as a reason for rerouting the SDV.

In an embodiment of the present invention, if the SDV on-board computer 301 detects hazardous roadway conditions (e.g., from roadway sensor(s) 208 shown in FIG. 2, and/or from roadway sensors 311 and/or from SDV equipment sensors 315 shown in FIG. 3), then the SDV on-board computer 301 will 1) slow down the SDV 202 (e.g., from 70 miles per hour down to 40 miles per hour); 2) warn the occupant(s) of the SDV 202 that the SDV 202 is about to slow down ("We're going to slow down to 40 miles per hour now . . . "); and 3) explain why the reduction in speed is going to occur (" . . . since there is ice on the roadway ahead"). Thus, one or more processors (e.g., within SDV on-board computer 301) detect, based on sensor readings from roadway sensors, roadway conditions of the roadway; adjust a speed of the SDV due to the road conditions; and provide the explanation to describe the roadway conditions of the roadway as a reason for adjusting the speed of the SDV.

In an embodiment of the present invention, if the SDV on-board computer 301 detects the speed of other vehicles on the roadway (e.g., from roadway sensors 311 shown in FIG. 3) and will then adjust the speed of the SDV 202 accordingly. For example, if other traffic (including traffic ahead of SDV 202) is going 70 miles per hour (in a 70 miles per hour speed zone) and SDV is initially only going 60 miles per hour, then the SDV on-board computer 301 will 1) speed up the SDV 202 (e.g., from 60 miles per hour up to 70 miles per hour); 2) warn the occupant(s) of the SDV 202 that the SDV 202 is about to speed down ("We're going to speed up now to 70 miles per hour . . . "); and 3) explain why the increased in speed is going to occur (" . . . in order to keep up with the flow of the traffic").

In one or more embodiments of the present invention, a decision as to whether or not to provide a warning the occupant(s) of the SDV about the upcoming maneuver and if so, what information to include in that warning, is based on the nature/traits of the occupant(s). As such, the occupant(s) are assigned to a particular cohort with which the occupant(s) share certain traits. Based on that cohort assignment, the warning (and decision to present or to not present the warning) is determined. Thus, in one or more embodiments of the present invention one or more processors assign the occupant of the SDV to a cohort of passengers (i.e., a cohort of occupants of SDVs), wherein members of the cohort of passengers share one or more common attributes. The processor(s) then adjust the explanation for the maneuver (i.e., the content ("There is ice ahead", style ("There is ICE AHEAD!"), and/or format (aural or visual) of the explanation. This presentation, as well as whether or not to present it to the occupant(s), is then based on the one or more common attributes of members of the cohort of passengers.

For example, assume that the cohort of occupants to which the occupant is assigned is a cohort of student drivers. In this embodiment/example, the processor(s) adjust the explanation based on the occupant of the SDV being in the cohort of student drivers. For example, the explanation may be directed to information needed by student drivers with little experience in driving, such as "I'm about to make a lane change. When you make a lane change, be sure to look at your side mirror first."

In another embodiment, the cohort of occupants to which the occupant(s) is assigned is a cohort of persons who are unfamiliar with the roadway. In this embodiment, the processor(s) adjust the explanation based on the occupant of the SDV being in the cohort of persons who are unfamiliar with the roadway. For example, the SDV may be slowing down in what appears to be an open roadway, but the SDV has access to a history of accidents along this stretch of roadway. Thus, the SDV will tell the occupant(s) "We're slowing down since this stretch of roadway has a history of accidents" upon determining, based on the occupant(s) travel history, that they have not traveled on this stretch of roadway.

In another embodiment of the present invention, the cohort of occupants to which the occupant(s) is assigned is a cohort of persons who have a predefined level of driving experience under predefined roadway conditions. In this embodiment, the processor(s) adjust the explanation based on the occupant of the SDV being in the cohort of persons who have a predefined level of driving experience under predefined roadway conditions. For example, even though the SDV is operating in autonomous mode, assume that the occupant of the SDV has driven the SDV or other vehicles in the past. Assume further that this occupant/driver has little experience driving in heavy rain on unlit roadways at night. As such, the occupant may be uncomfortable with the SDV traveling at 70 miles per hour on a rainy, unlit back road at night. In order to assure the occupant, the SDV will present an aural message over the speaker in the SDV telling the occupant "This SDV is equipped with state of the art sensors in order to safely handle these rainy and dark conditions", in order to calm the occupant.

In another embodiment of the present invention, the cohort of occupants to which the occupant(s) is assigned is a cohort of persons who are not familiar with the particular SDV in which they are traveling. For example, assume that the occupant(s) have not ridden in this particular model of SDV, and therefore are surprised when it makes sharp turns, travels fast around corners, etc. Although this model of SDV is proven to be able to safely make such maneuvers, the occupant(s) will nonetheless be surprised/distressed when they occur unless the SDV provides them with appropriate warnings (e.g., "I'm going to safely go around this upcoming curve at 70 miles per hour").

In another embodiment of the present invention, the cohort of occupants to whom the occupant is assigned is a cohort of persons sharing a same physiological state. In this embodiment, the processor(s) adjust the explanation based on the occupant of the SDV being in the cohort of persons that share the same physiological state. For example, assume that the processor(s) (e.g., within SDV on-board computer 301 shown in FIG. 3) receive biometric sensor readings from a biometric sensor (e.g., biometric sensor 335 shown in FIG. 3) that is monitoring the occupant of the SDV. As described herein, biometric sensor 335 may be a camera that captures and analyzes certain facial expressions and/or body language (indicative of an anxious state), a respiration monitor (capturing shallow breathing, indicative of the anxious state), a blood pressure monitor (capturing high blood pressure, indicative of the anxious state), etc. Once the processor(s) determine that the occupant is in a certain physiological (or emotional/psychological) state, then the processor(s) adjust the explanation. For example, if the occupant is highly agitated, then the explanation may be something like "This SDV is operating perfectly, and detects no hazardous conditions. Please enjoy the ride!" However, if the occupant is completely at ease, then the SDV may elect to tell the occupant nothing (i.e., adjusts the explanation by simply deleting it and its presentation to the occupant).

In one or more embodiments of the present invention, the warnings provided by the SDV to the occupant(s) of the SDV are tailored for those who are visually impaired. For example, assume that the hardware shown in FIG. 3 detects an unexpected traffic slow-down of SDV 202. A person with normal vision will see the slowing/stopping traffic on the roadway, and will need no explanation for the SDV 202 slowing/stopping as well. However, one who is visually impaired is likely to not understand why SDV 202 is slowing/stopping, since they have no visual cues regarding the unexpected traffic slow-down. Thus, the SDV 202 will provide a commentary/explanation to the visually impaired occupant(s), in order to let them know what is going on.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
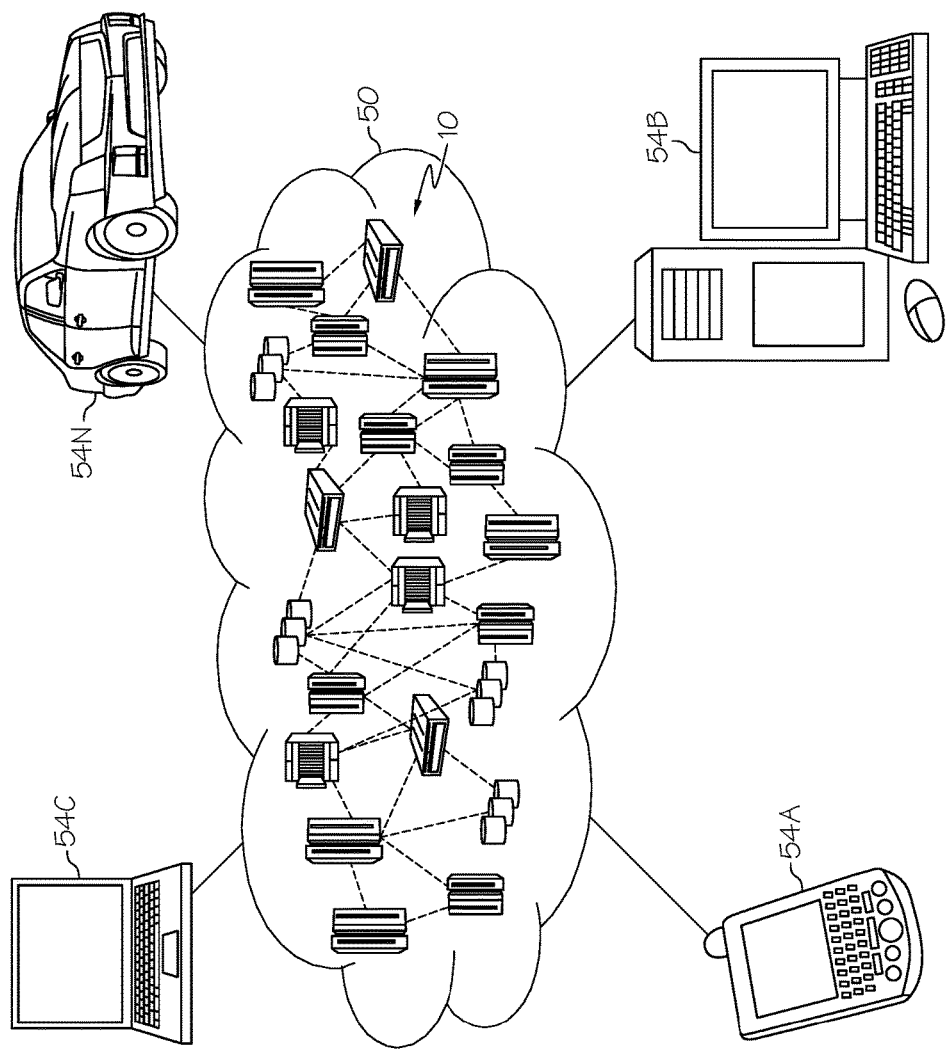
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
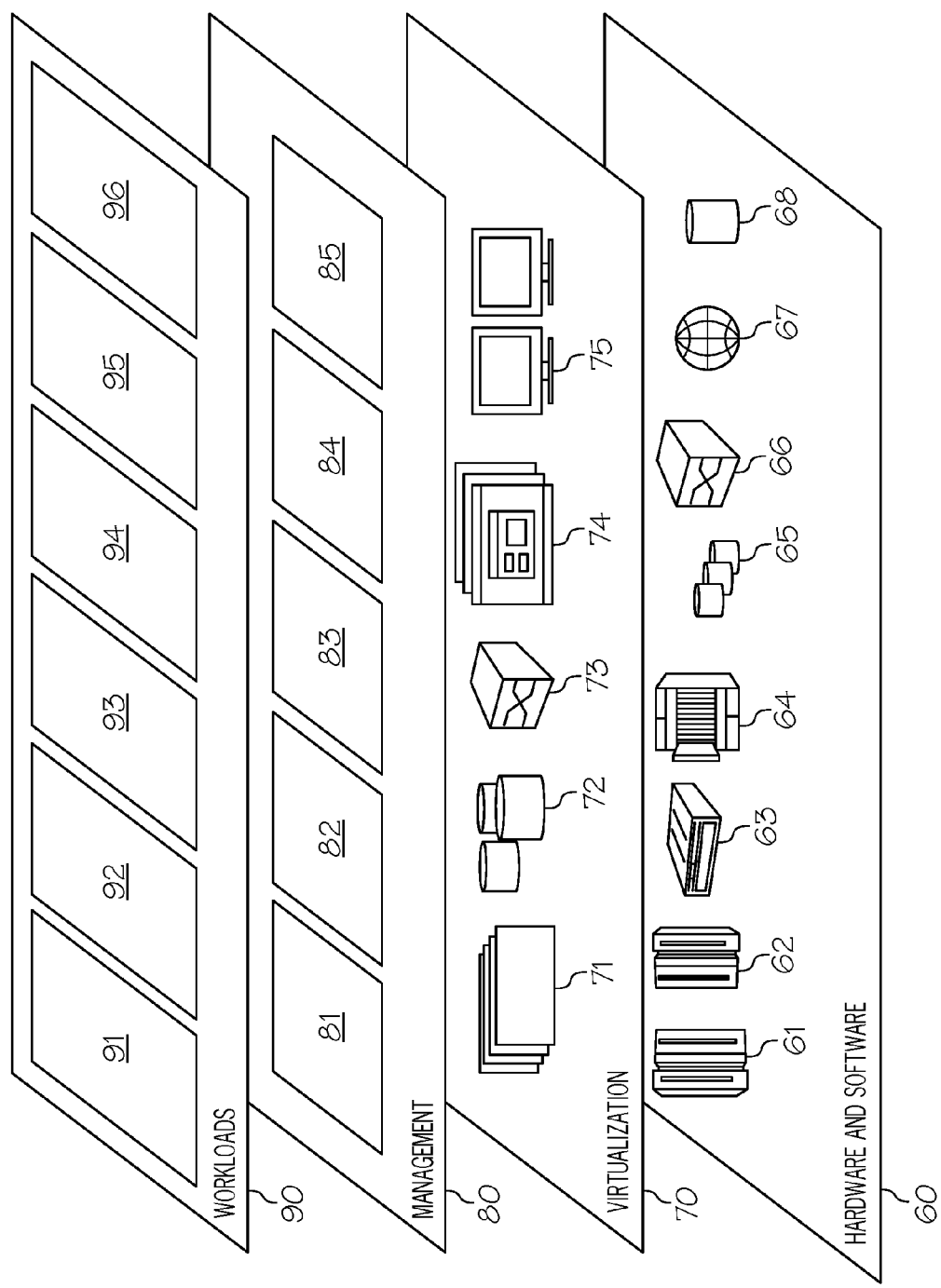
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and upcoming maneuver prediction and messaging processing 96 in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by one or more processors, sensor readings that describe a condition of a roadway upon which a self-driving vehicle (SDV) is traveling, wherein the sensor readings are from roadway sensors that detect ice on the roadway;
    predicting, by the one or more processors and based on the sensor readings, a maneuver to be taken at a future time by the SDV on the roadway;
    providing, by the one or more processors, an explanation for the maneuver to an occupant of the SDV, wherein the explanation for the maneuver describes the maneuver, and wherein the explanation explains why the SDV will be taking the maneuver at the future time;
    executing, by the SDV, the maneuver at the future time;
    detecting, by the one or more processors and based on the sensor readings from the roadway sensors, the ice on the roadway;
    rerouting, by the one or more processors, the SDV due to the ice on the roadway;
    providing, by the one or more processors, the explanation for the maneuver to the occupant of the SDV to describe the ice on the roadway as a reason for rerouting the SDV;
    assigning, by the one or more processors, the occupant of the SDV to a cohort of occupants of SDVs, wherein members of the cohort of occupants of the SDVs, including the occupant of the SDV, are all student drivers who are unfamiliar with the roadway, have a predefined level of driving experience under predefined physical roadway conditions, share a same physiological state, and share a same psychological state, wherein a physiological state and a psychological state of the occupant of the SDV are determined based on biometric sensor readings from a biometric sensor that is monitoring the occupant of the SDV;
    adjusting, by the one or more processors, the explanation based on the occupant of the SDV being in the cohort of occupants of SDVs;
    receiving, by the one or more processors, equipment sensor readings from SDV on-board equipment sensors that describe a defective component of the SDV;
    predicting, by the one or more processors and based on the equipment sensor readings, an emergency maneuver to be taken due to the defective component of the SDV; and
    providing, by the one or more processors, an emergency explanation for the emergency maneuver to the occupant of the SDV, wherein the emergency explanation for the emergency maneuver informs the occupant of the SDV that the SDV will be maneuvering off the roadway due to the defective component of the SDV; and
    maneuvering, by the one or more processors on the SDV, the SDV off the roadway.

2. The method of claim 1, wherein the sensor readings are also from roadway sensors that detect a loose object on the roadway, and wherein the method further comprises:
    detecting, by the one or more processors and based on the sensor readings from the roadway sensors, the loose object on the roadway;
    rerouting, by the one or more processors, the SDV due to the loose object on the roadway; and
    providing, by the one or more processors, a loose object explanation to the occupant of the SDV that describes the loose object on the roadway as a reason for rerouting the SDV.

3. The method of claim 1, wherein the explanation is conveyed aurally to the occupant of the SDV.

4. The method of claim 1, wherein the explanation is conveyed visually to the occupant of the SDV.

5. The method of claim 1, further comprising:
    generating, by the one or more processors, a verbal description of observations of surroundings of the SDV that are detected by on-board sensors on the SDV and the maneuver to be executed at the future time by an on-board computer of the SDV; and
    providing, by the one or more processors, the verbal description of the observations of the surroundings of the SDV and the maneuver to be executed at the future time by the on-board computer to the occupant of the SDV.

6. The method of claim 1, further comprising:
    adjusting, by the one or more processors, a speed of the SDV due to the ice on the roadway; and
    providing, by the one or more processors, a speed explanation to describe the ice on the roadway as a reason for adjusting the speed of the SDV.

7. The method of claim 1, wherein the method is implemented as a cloud-based service.

8. The method of claim 1, wherein the explanation for the maneuver is presented as a text message, and wherein the method further comprises:
    adjusting, by the one or more processors, a font on the text message based on one or more common attributes of the members of the cohort of occupants of the SDVs.

9. A computer program product comprising one or more non-transitory computer readable storage mediums, and program instructions stored on at least one of the one or more non-transitory computer readable storage mediums, the program instructions comprising:
    program instructions to receive sensor readings that describe a condition of a roadway upon which a self-driving vehicle (SDV) is traveling, wherein the sensor readings are from roadway sensors that detect ice on the roadway;

program instructions to predict, based on the sensor readings, a maneuver to be taken at a future time by the SDV on the roadway;

program instructions to provide an explanation for the maneuver to an occupant of the SDV, wherein the explanation for the maneuver describes the maneuver, and wherein the explanation explains why the SDV will be taking the maneuver at the future time;

program instructions to execute the maneuver at the future time;

program instructions to detect, based on the sensor readings from the roadway sensors, the ice on the roadway;

program instructions to reroute the SDV due to the ice on the roadway;

program instructions to provide the explanation for the maneuver to the occupant of the SDV to describe the ice on the roadway as a reason for rerouting the SDV;

program instructions to assign the occupant of the SDV to a cohort of occupants of SDVs, wherein members of the cohort of occupants of the SDVs, including the occupant of the SDV, are all student drivers who are unfamiliar with the roadway, have a predefined level of driving experience under predefined physical roadway conditions, share a same physiological state, and share a same psychological state, wherein a physiological state and a psychological state of the occupant of the SDV are determined based on biometric sensor readings from a biometric sensor that is monitoring the occupant of the SDV;

program instructions to adjust the explanation based on the occupant of the SDV being in the cohort of occupants of SDVs;

program instructions to receive equipment sensor readings from SDV on-board equipment sensors that describe a defective component of the SDV;

program instructions to predict, based on the equipment sensor readings, an emergency maneuver to be taken due to the defective component of the SDV; and program instructions to provide an emergency explanation for the emergency maneuver to the occupant of the SDV, wherein the emergency explanation for the emergency maneuver informs the occupant of the SDV that the SDV will be maneuvering off the roadway due to the defective component of the SDV; and program instructions to maneuver the SDV off the roadway.

10. The computer program product of claim 9, wherein the program instructions are provided as a service in a cloud environment.

11. A system comprising:
one or more processors;
one or more computer readable memories operably coupled to the one or more processors;
one or more computer readable storage mediums operably coupled to the one or more computer readable memories; and program instructions stored on at least one of the one or more computer readable storage mediums for execution by at least one of the one or more processors via at least one of the one or more computer readable memories, the program instructions comprising:

program instructions configured to receive one or more sensor readings related to a condition of a roadway upon which a self-driving vehicle (SDV) is traveling, wherein the sensor readings are from roadway sensors that detect ice on the roadway;

program instructions configured to predict, based on the sensor readings, a maneuver to be taken at a future time by the SDV on the roadway;

program instructions configured to provide an explanation for the maneuver to an occupant of the SDV to describe the maneuver and why the maneuver will be taken at the future time;

program instructions to execute the maneuver at the future time;

program instructions to detect, based on the sensor readings from the roadway sensors, the ice on the roadway;

program instructions to reroute the SDV due to the ice on the roadway;

program instructions to provide the explanation for the maneuver to the occupant of the SDV to describe the ice on the roadway as a reason for rerouting the SDV;

program instructions to assign the occupant of the SDV to a cohort of occupants of SDVs, wherein members of the cohort of occupants of the SDVs, including the occupant of the SDV, are all student drivers who are unfamiliar with the roadway, have a predefined level of driving experience under predefined physical roadway conditions, share a same physiological state, and share a same psychological state, wherein a physiological state and a psychological state of the occupant of the SDV are determined based on biometric sensor readings from a biometric sensor that is monitoring the occupant of the SDV;

program instructions to adjust the explanation based on the occupant of the SDV being in the cohort of occupants of SDVs;

program instructions to receive equipment sensor readings from SDV on-board equipment sensors that describe a defective component of the SDV;

program instructions to predict, based on the equipment sensor readings, an emergency maneuver to be taken due to the defective component of the SDV; and program instructions to provide an emergency explanation for the emergency maneuver to the occupant of the SDV, wherein the emergency explanation for the emergency maneuver informs the occupant of the SDV that the SDV will be maneuvering off the roadway due to the defective component of the SDV; and program instructions to maneuver the SDV off the roadway.

* * * * *